US009578529B1

(12) United States Patent
Antarkar et al.

(10) Patent No.: US 9,578,529 B1
(45) Date of Patent: Feb. 21, 2017

(54) CELLULAR DATA TESTING SYSTEM

(71) Applicant: Verizon Patent and Licensing Inc., Arlington, VA (US)

(72) Inventors: Vinayak Antarkar, Lexington, VA (US); Venkat G. Kolli, Shirley, MA (US); Gong Zhang, Waltham, MA (US); Jian Huang, Sudbury, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/812,383

(22) Filed: Jul. 29, 2015

(51) Int. Cl.
  *H04W 24/08* (2009.01)
  *H04W 4/02* (2009.01)
(52) U.S. Cl.
  CPC ............. *H04W 24/08* (2013.01); *H04W 4/02* (2013.01)
(58) Field of Classification Search
  CPC ..... H04W 16/18; H04W 16/22; H04W 24/00; H04W 28/08; H04W 28/16; H04W 36/22; H04W 16/06; H04W 28/04; H04W 28/18; H04W 28/24; H04W 72/085
  USPC .............................. 455/423–425, 452.2, 453
  See application file for complete search history.

(56) References Cited

U.S. PATENT DOCUMENTS

| 2006/0259629 | A1* | 11/2006 | Usmani | G06F 11/3688 709/227 |
| 2009/0104915 | A1* | 4/2009 | Katis | H04L 12/581 455/452.2 |
| 2009/0124250 | A1* | 5/2009 | Topaltzas | H04W 24/06 455/423 |
| 2012/0221893 | A1* | 8/2012 | Bai | H04L 43/50 714/27 |
| 2014/0005974 | A1* | 1/2014 | Vyas | G06F 11/263 702/123 |
| 2015/0189578 | A1* | 7/2015 | van der Laak | H04W 4/001 455/419 |

* cited by examiner

*Primary Examiner* — Kamran Afshar
*Assistant Examiner* — Nicole Louis-Fils

(57) ABSTRACT

A device may receive preferences related to performing cellular data testing in a cellular network. The preferences may identify one or more target network addresses. The device may receive location information identifying a testing location. The device may configure a component of the device to set a location of the device based on the location information. The device may perform a cellular data test by transmitting network traffic to the one or more target network addresses via a gateway associated with the testing location. The device may determine a result of the cellular data testing based on transmitting the network traffic. The device may selectively provide a notification based on the result.

20 Claims, 15 Drawing Sheets

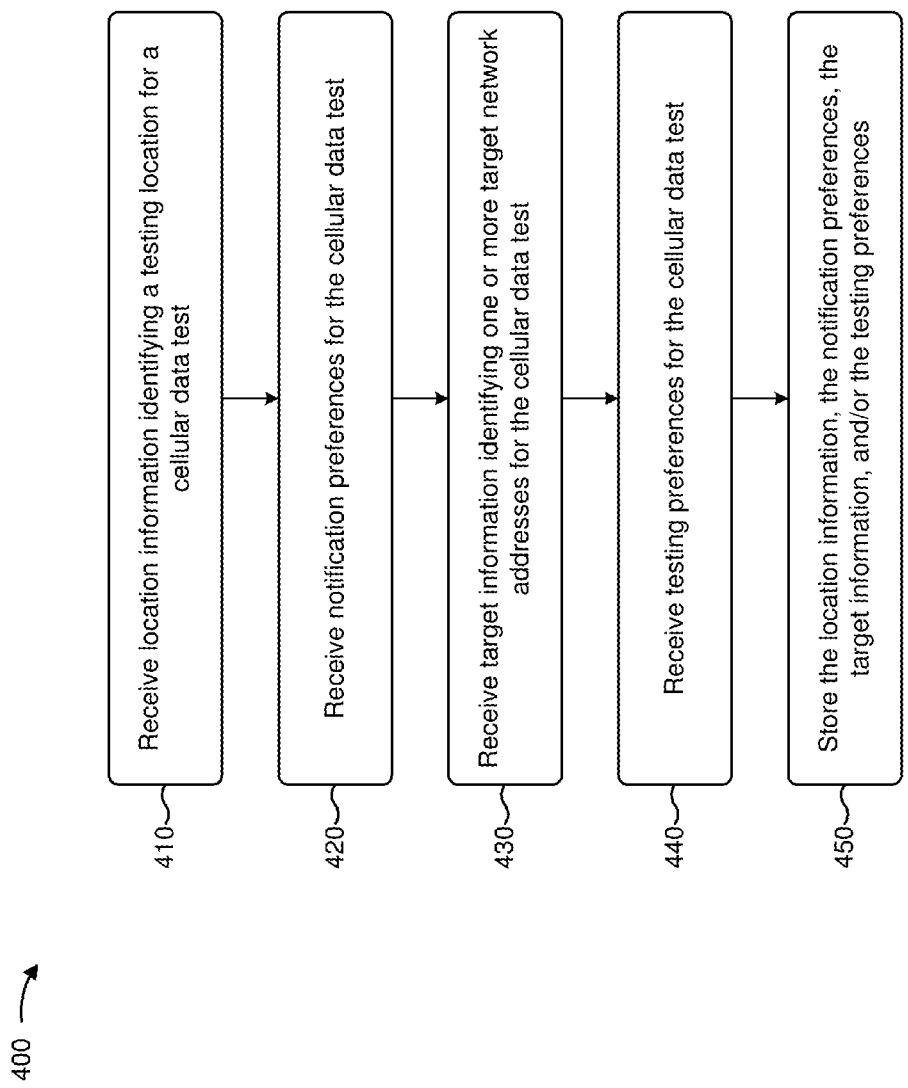

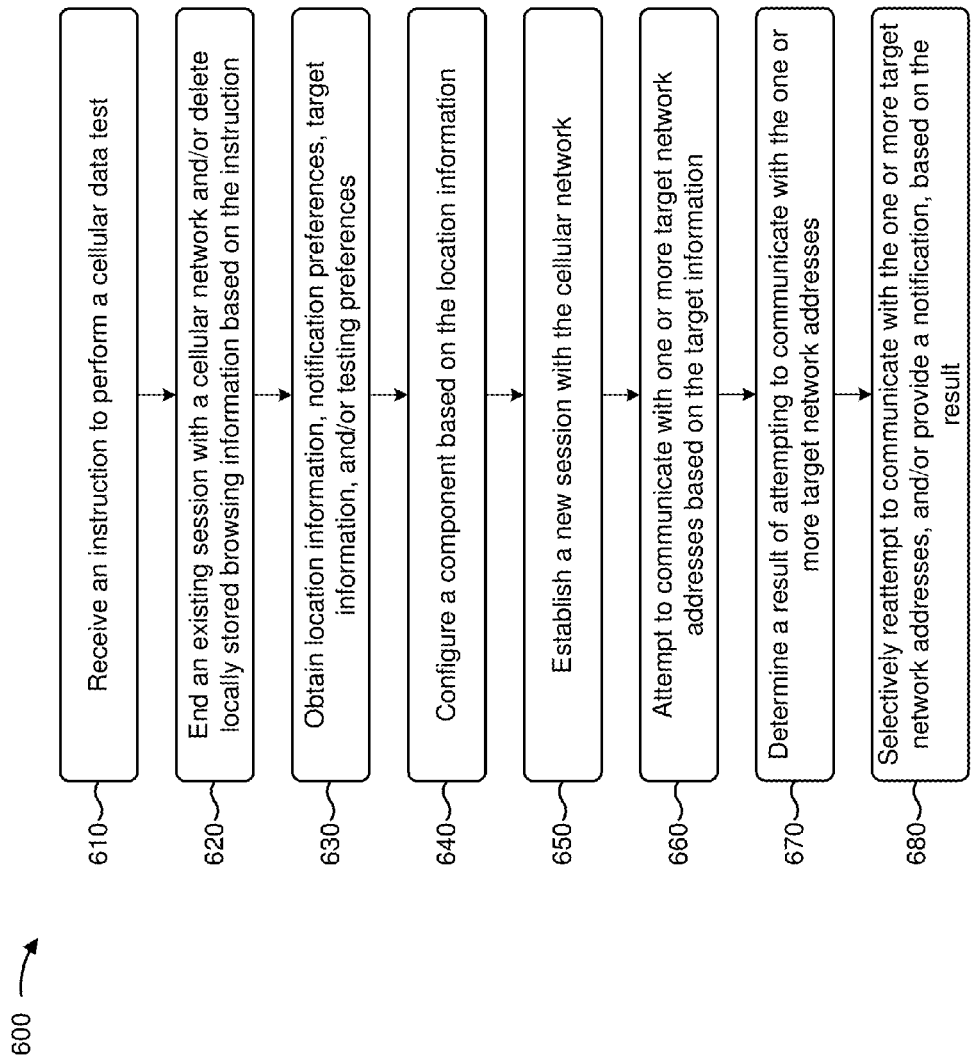

CELLULAR DATA TESTING SYSTEM

BACKGROUND

A mobile device may communicate with other devices via a cellular network. Devices of the cellular network may route network traffic (e.g., packets, etc.) from the mobile device to the other devices and/or from the other devices to the mobile device.

BRIEF DESCRIPTION OF THE DRAWINGS

FIG. 4 is a flow chart of an example process for configuring a cellular data testing system;

FIG. 6 is a flow chart of an example process for performing a cellular data test.

DETAILED DESCRIPTION OF PREFERRED EMBODIMENTS

The following detailed description of example implementations refers to the accompanying drawings. The same reference numbers in different drawings may identify the same or similar elements.

A mobile device may provide network traffic (e.g., packets, etc.) to another device, and/or may receive network traffic from the other device, via a cellular network. The mobile device may be associated with a particular location. Gateways, associated with the cellular network, may provide the network traffic based on the particular location. For example, a first gateway may be associated with a first location, a second gateway may be associated with a second location, and so on. The mobile device may test whether a gateway is functioning correctly by attempting to provide network traffic to a set of target network addresses via the gateways. However, the mobile device may be capable of testing only a subset of the gateways associated with the cellular network, based on only the subset of the gateways being associated with the particular location of the mobile device. Implementations described herein may enable the mobile device to test gateways associated with another location (e.g., a location remote from the mobile device), by reconfiguring the mobile device to transmit network traffic to the set of target network addresses as if located at the other location.

Figure 1A:
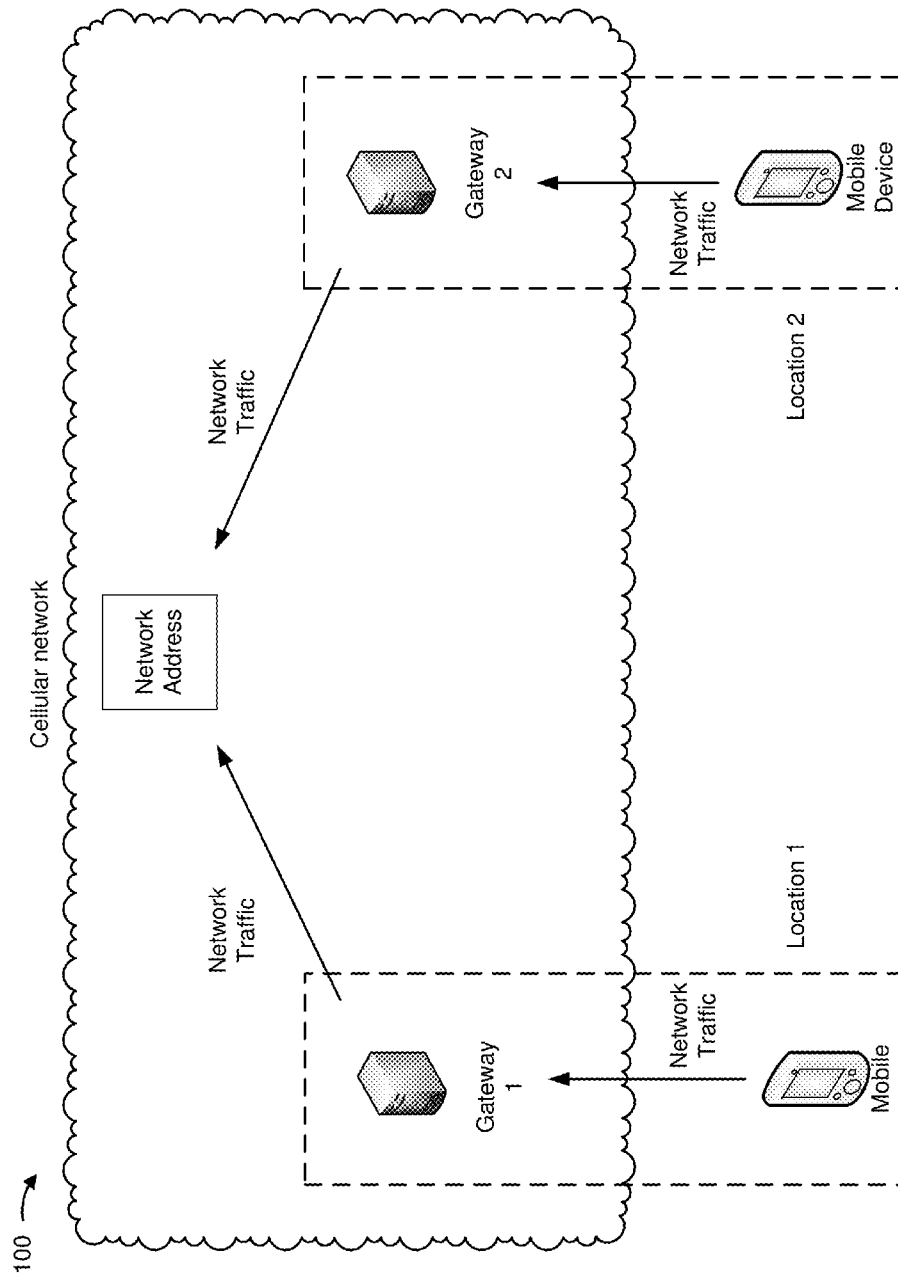
FIGS. 1A and 1B are diagrams of an overview of an example implementation described herein.
Figure 1B:
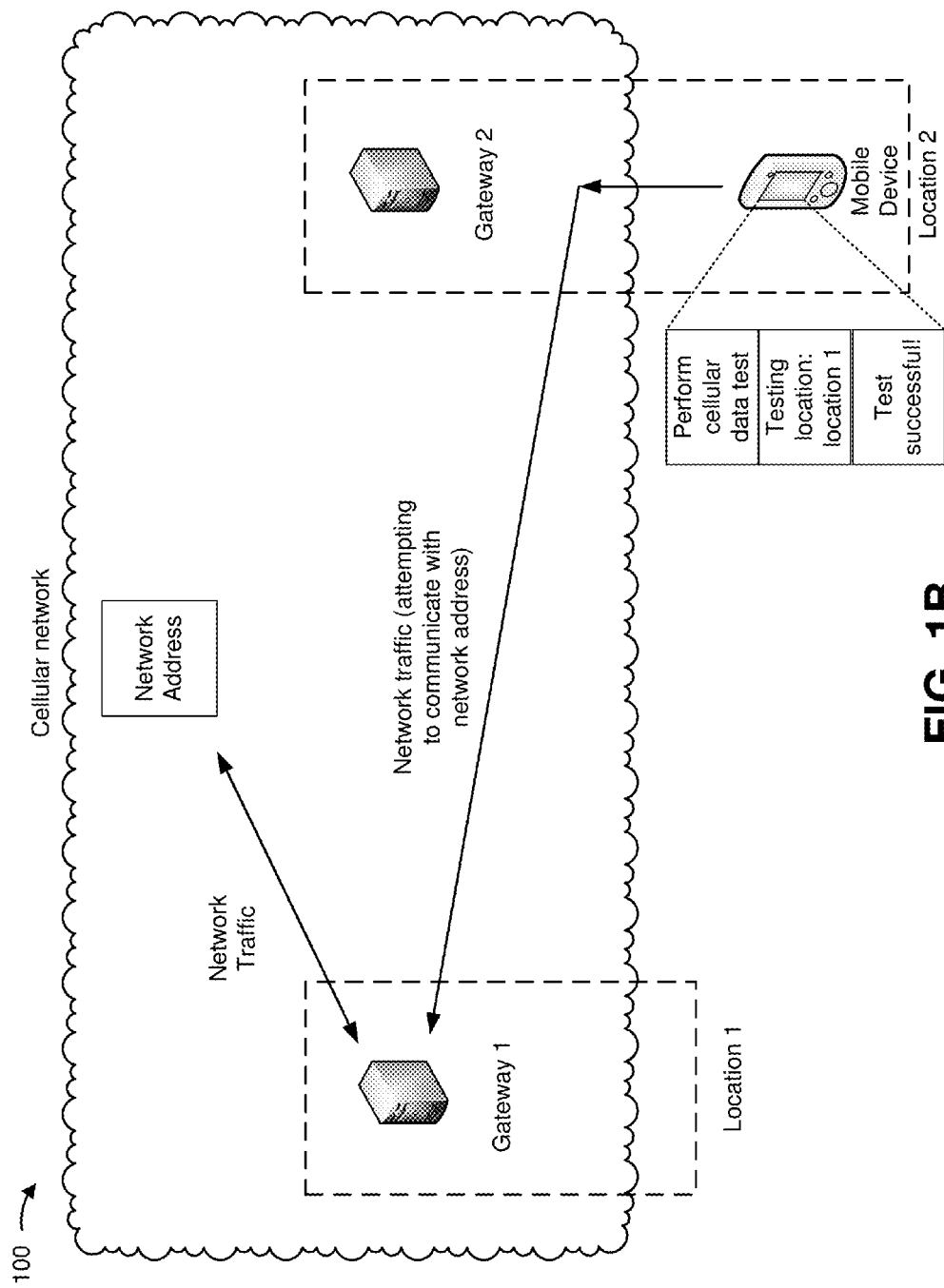

FIGS. 1A and 1B are diagrams of an overview of an example implementation 100 described herein. As shown in FIG. 1A, mobile devices may transmit network traffic to a network address (e.g., to a device associated with the network address). As shown, a first gateway (e.g., gateway 1) may provide network traffic associated with mobile devices that are located at a first location (e.g., location 1) and a second gateway (e.g., gateway 2) may provide network traffic associated with mobile devices that are located at a second location (e.g., location 2).

As shown in FIG. 1B, a mobile device at location 2 may perform a cellular data test. As further shown, the mobile device may determine to perform the cellular data test based on a testing location of location 1. Assume that the mobile device configures a component of the mobile device (e.g., a subscriber identity module (SIM) card of the mobile device) so that the cellular network routes network traffic, associated with the mobile device, via gateway 1. As shown, the mobile device may transmit network traffic via gateway 1 to perform the cellular data test with regard to the network address. As shown, the mobile device may determine that the cellular data test is successful. For example, the mobile device may determine that the cellular data test is successful based on receiving network traffic from the network address (e.g., in response to the network traffic transmitted to the network address via gateway 1).

In this way, the mobile device may test a cellular data connection by transmitting network traffic to a network address. The mobile device, at a first location, may cause the network traffic to be routed via a gateway at a second location, which may conserve resources used to test the gateway at the second location and/or improve versatility of the cellular data testing system.

Figure 2:
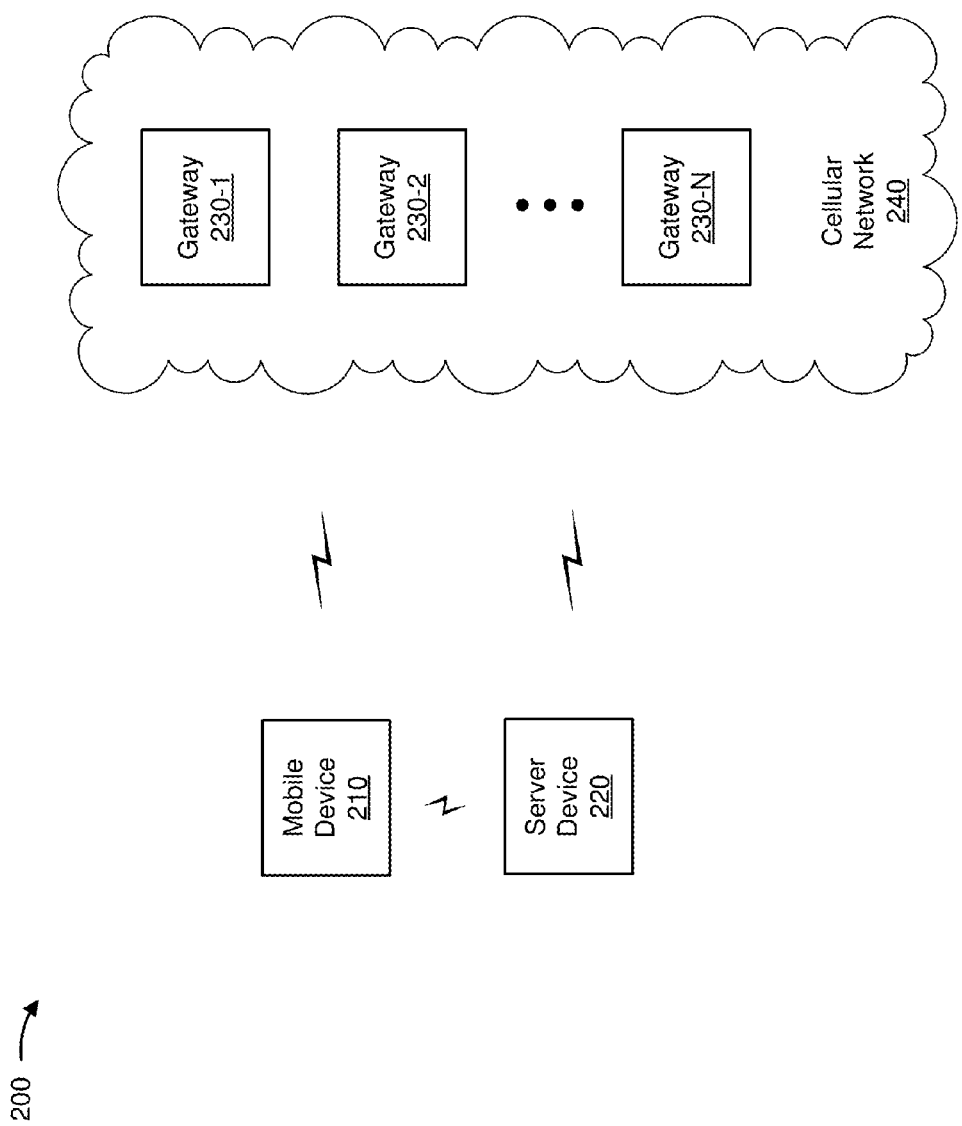
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 210, a server device 220, one or more gateways 230-1 through 230-N (N≥1) (hereinafter referred to collectively as "gateways 230," and individually as "gateway 230"), and a cellular network 240. Devices of environment 200 may interconnect via wired connections, wireless connections, or a combination of wired and wireless connections.

Mobile device 210 may include a device capable of receiving, generating, storing, processing, and/or providing information via cellular network 240. For example, mobile device 210 may include a communications and/or computing device, such as a mobile phone (e.g., a smart phone, etc.), a laptop computer, a tablet computer, a handheld computer, or a similar device. Mobile device 210 may establish a session with cellular network 240. Mobile device 210 may provide network traffic to and/or receive network traffic from devices associated with one or more target network addresses. Mobile device 210 may include a subscriber identity model (SIM) card, which may identify a location associated with mobile device 210. Mobile device 210 may modify the location identified by the SIM card based on information identifying a testing location.

Server device 220 may include one or more devices capable of receiving, generating, storing, processing, and/or providing information. For example, server device 220 may include a computing device, such as a server, a desktop computer, a laptop computer, a tablet computer, or a similar device. Server device may receive, store, and/or provide information related to a cellular data test (e.g., location information, notification preferences, target information, testing preferences, notifications, etc.).

Gateway 230 may include one or more devices capable of providing connectivity for mobile device 210 to external networks (e.g., networks other than cellular network 240). For example, gateway 230 may include one or more data processing and/or traffic transfer devices, such as a gateway (e.g., a packet data network gateway, a service gateway, or the like), a router, a modem, a switch, a firewall, a NIC, a hub, a bridge, a server device, an OADM, or any other type of device that processes and/or transfers traffic. Gateway 230 may provide network traffic (e.g., packets, etc.) from mobile device 210 to a device associated with an external network (e.g., a device associated with a target network address), and/or may provide network traffic to mobile device 210 from the device associated with the external network. Gateways 230-1 through 230-N may be associated with particular locations (e.g., geographical regions, cities, states, countries, etc.). For example, a first gateway 230-1 may be associated with a different location than a second gateway 230-2, which may be associated with a different location that a third gateway 230-3, and so on.

Cellular network 240 may include one or more wireless networks. For example, cellular network 240 may include an LTE network, a 3G network, a code division multiple access (CDMA) network, and/or a combination of these or another type of cellular network. Cellular network 240 may include one or more gateways 230, which may provide connectivity for mobile device 210 to external networks associated with target network addresses.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
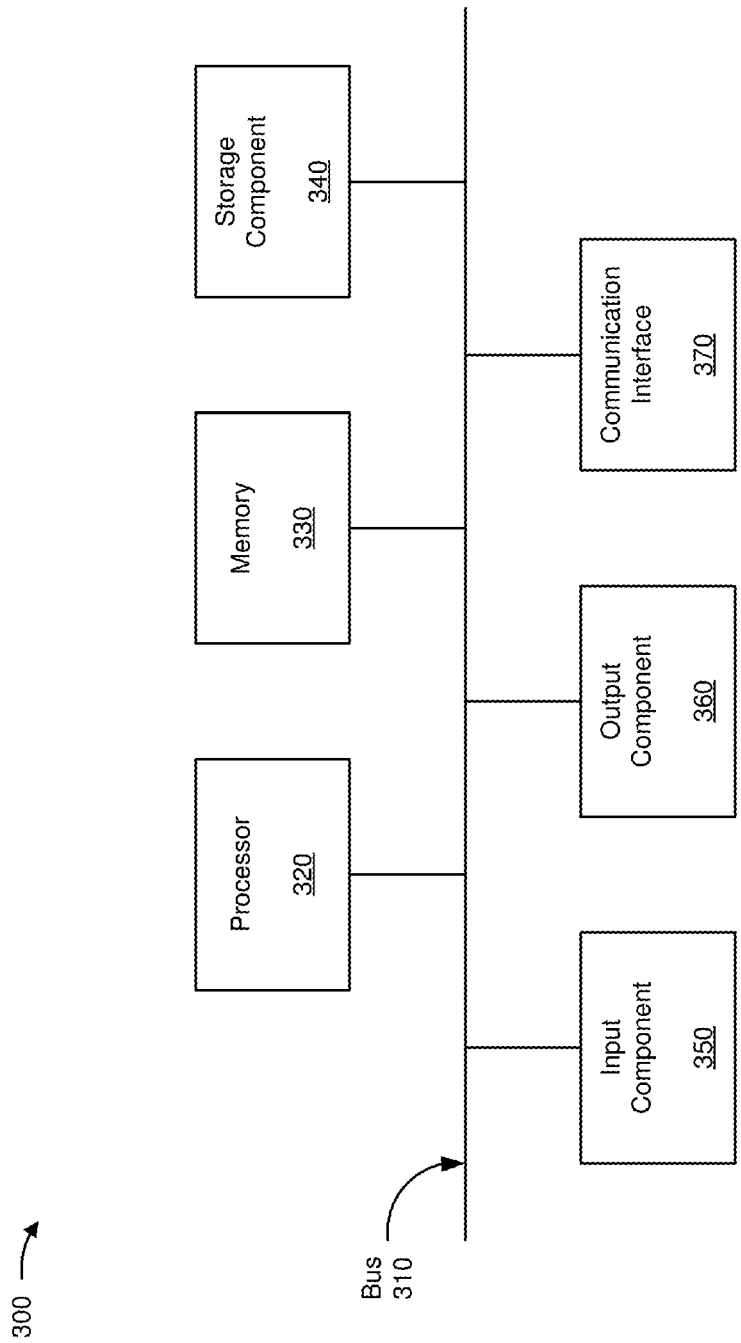
FIG. 3 is a diagram of example components of one or more devices of FIG. 2.

FIG. 3 is a diagram of example components of a device 300. Device 300 may correspond to mobile device 210, server device 220, and/or gateway 230. In some implementations, mobile device 210, server device 220, and/or gateway 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for configuring a cellular data testing system. In some implementations, one or more process blocks of FIG. 4 may be performed by mobile device 210. Additionally, or alternatively, one or more process blocks of FIG. 4 may be performed by another device or a group of devices separate from or including mobile device 210, such as server device 220 and/or gateway 230.

As shown in FIG. 4, process 400 may include receiving location information identifying a testing location for a cellular data test (block 410). For example, mobile device 210 may receive location information. The location information may identify a testing location. Mobile device 210 may be located at the testing location, or may be remote from the testing location. Based on the testing location, mobile device 210 may perform a cellular data test to test access to one or more target network addresses via cellular network 240.

In some implementations, the location information may identify geographic coordinates, a postal code, a city, a state, or the like. In some implementations, mobile device 210 may determine the location information. For example, mobile device 210 may determine a current location of mobile device 210, and may use the current location as the testing location. As another example, mobile device 210 may determine the location information based on a default setting (e.g., a default testing location stored by mobile device 210, server device 220, etc.). Additionally, or alternatively, the location information may identify a region that is associated with a particular gateway 230. Mobile device 210 may determine the testing location based on the region. In this way, mobile device 210 may perform a cellular data test with regard to the particular gateway 230, irrespective of a location of mobile device 210.

In some implementations, mobile device 210 may be located at the testing location. For example, mobile device 210 may be included in a cellular network region that includes the testing location. In some implementations, mobile device 210 may be remote from the testing location. For example, the location information may identify a testing location in California, and mobile device 210 may be located in Massachusetts. In this way, mobile device 210 may perform cellular data testing via a gateway 230 that is associated with a remote testing location, which may improve versatility of the cellular data testing system and/or conserve resources used for testing cellular network 240.

Mobile device 210 may receive the location information via a user interface, in some implementations. For example, a user of mobile device 210 may input the location information. Additionally, or alternatively, mobile device 210 may receive the location information from another device. For example, mobile device 210 may receive the location information from server device 220.

As further shown in FIG. 4, process 400 may include receiving notification preferences for the cellular data test (block 420). For example, mobile device 210 may receive notification preferences for the cellular data test. The notification preferences may identify notifications to provide based on the cellular data test, recipients of the notifications, and/or conditions for providing the notifications. In some implementations, mobile device 210 may receive the notification preferences via a user interface of mobile device 210. For example, a user may input the notification preferences. Additionally, or alternatively, mobile device 210 may receive the notification preferences from another device, such as server device 220. Additionally, or alternatively, mobile device 210 may determine the notification preferences (e.g., based on default notification preferences, etc.).

In some implementations, the notification preferences may relate to a failure notification, to be provided when the cellular data test is unsuccessful. For example, the notification preferences may identify an address to which to provide a failure notification (e.g., a Mobile Directory Number (MDN), an International Mobile Station Equipment Identity (IMEI), an email address, an Internet Protocol (IP) address, etc.), content to include in the failure notification (e.g., information identifying target network addresses, information identifying the testing location, a quantity of cellular data tests performed by mobile device 210, a test identifier identifying the cellular data test, information identifying mobile device 210, etc.), or the like.

In some implementations, the notification preferences may relate to a success notification, to be provided when the cellular data test is successful. For example, the notification preferences may identify an address to which to provide a success notification (e.g., an MDN, an IMEI, an email address, an IP address, etc.), content to include in the success notification (e.g., information identifying target network addresses, information identifying the testing location, a quantity of cellular data tests performed before the successful cellular data test, a test identifier identifying the cellular data test, information identifying mobile device 210, etc.), or the like.

In some implementations, the notification preferences may indicate whether to provide a success notification and/or a failure notification. For example, the notification preferences may indicate to provide a success notification if the cellular data test is successful, and to provide a failure notification if the cellular data test is unsuccessful. As another example, the notification preferences may indicate not to provide a success notification if the cellular data test is successful, which may reduce a quantity of notifications provided by mobile device 210 and, thus, conserve resources of mobile device 210 and/or cellular network 240 (e.g., when mobile device 210 performs cellular data tests frequently, such as on an hourly basis, on a daily basis, etc.).

As further shown in FIG. 4, process 400 may include receiving target information identifying one or more target network addresses for the cellular data test (block 430). For example, mobile device 210 may receive target information. The target information may identify one or more target network addresses for the cellular data test. In some implementations, mobile device 210 may receive the target information via a user interface of mobile device 210. For example, a user may input the target information via the user interface. Additionally, or alternatively, mobile device 210 may receive the target information from another device, such as server device 220. Additionally, or alternatively, mobile device 210 may determine the target information (e.g., based on default target information, based on target information associated with a particular testing location, etc.).

The target information may identify one or more target network addresses for the cellular data test. For example, the target information may include one or more IP addresses, Uniform Resource Locators (URLs), Uniform Resource Identifiers (URIs), MDNs, IMEIs, email addresses, or the like. In some implementations, the target information may include multiple target network addresses. For example, the target information may specify several target network addresses, may specify a range of target network addresses, may specify a set of target network addresses to test in a specific order, or the like.

In some implementations, the target information may identify network addresses associated with a toll-free data service. The toll-free data service may charge an entity other than a subscriber associated with mobile device 210 for data provided to and/or received from mobile device 210. The target information may identify target network addresses associated with the toll-free data service in order to test whether network traffic, provided to and/or received from devices associated with the toll-free data service, is properly routed by gateway 230 and/or other devices of network 240. In this way, mobile device 210 may determine whether a toll-free data service is properly implemented based on the cellular data test, which may simplify implementation of the toll-free data service and/or improve reliability of cellular network 240.

In some implementations, mobile device 210 may determine the target information. For example, a testing location may be associated with one or more target network addresses, and mobile device 210 may determine the one or more target network addresses based on the testing location. As another example, a user may provide a search query, and mobile device 210 may determine target network addresses based on the search query (e.g., URLs associated with search results of the search query, etc.). As another example, a user may specify a type of network service (e.g., Voice over IP, Voice over LTE, video calling, etc.), and mobile device 210 may select one or more target network addresses that are associated with the type of network service. As another example, mobile device 210 may query a server for the target network addresses. In this way, mobile device 210 may determine target network addresses, which may conserve processor resource otherwise used to obtain the target network addresses from a user or another device.

As further shown in FIG. 4, process 400 may include receiving testing preferences for the cellular data test (block 440). For example, mobile device 210 may receive testing preferences for the cellular data system. The testing preferences may relate to a failure threshold, a quantity of cellular data tests to perform, an interval of time in between performing cellular data tests, or the like. In some implementations, mobile device 210 may receive the testing preferences via a user interface of mobile device 210. For example, a user may input the testing preferences. Additionally, or alternatively, mobile device 210 may receive the testing preferences from another device, such as server device 220. Additionally, or alternatively, mobile device 210 may determine the testing preferences (e.g., based on default testing preferences, based on testing preferences associated with a particular testing location, etc.).

The testing preferences may relate to determining whether the cellular data test is successful. For example, the testing preferences may identify a failure threshold. The failure threshold may specify a quantity, a ratio, or the like. In some implementations, the failure threshold may include a ratio based on a quantity of target network addresses associated with devices that receive the network traffic of the cellular data test, as compared to a quantity of target network addresses that are associated with devices that do not receive the network traffic of the cellular data test. If the cellular data test satisfies the failure threshold, mobile device 210 may determine that the cellular data test is successful. For example, if the failure threshold is 75%, and the cellular data test successfully contacts nine target network addresses out of ten target network addresses, mobile device 210 may determine that the cellular data test is successful, and mobile device 210 may, for example, transmit a success notification based on the notification preferences.

In some implementations, the testing preferences may identify a quantity of cellular data tests to perform. For example, assume that mobile device 210 performs a first cellular data test to communicate with a set of target network addresses, and the first cellular data test does not satisfy the failure threshold. If the testing preferences specify to perform one cellular data test, mobile device 210 may not perform a second cellular data test, and may transmit a failure notification, in some implementations. If the testing preferences specify to perform two cellular data tests, mobile device 210 may perform a second cellular data test to communicate with the set of target network addresses. If the second attempt does not satisfy the failure threshold, mobile device 210 may transmit the failure notification. If the second attempt satisfies the failure threshold, mobile device 210 may transmit a success notification. In this way, mobile device 210 may perform multiple cellular data tests based on the testing preferences, which may improve versatility of the cellular data test and/or reduce a quantity of false positives and/or false negatives associated with the cellular data test.

As further shown in FIG. 4, process 400 may include storing the location information, the notification preferences, the target information, and/or the testing preferences (block 450). For example, mobile device 210 may store the location information, the notification preferences, the target information, and/or the testing preferences. In some implementations, mobile device 210 may store the location information, the notification preferences, the target information, and/or the testing preferences locally. Additionally, or alternatively, mobile device 210 may provide the location information, the notification preferences, the target information, and/or the testing preferences to another device (e.g., server device 220, etc.) for storage. The other device may provide the location information, the notification preferences, the target information, and/or the testing preferences to mobile device 210 based on mobile device 210 requesting the location information, the notification preferences, the target information, and/or the testing preferences, or based on mobile device 210 initiating a cellular data test.

In this way, mobile device 210 may configure a cellular data test to communicate with one or more target network addresses based on a testing location, which may permit mobile device 210 to test data connections via cellular network 240 in a variety of locations and via a variety of gateways 230, irrespective of a location of mobile device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are diagrams of an example implementation 500 relating to example process 400 shown in FIG. 4. FIGS. 5A-5D show an example of configuring a cellular data testing system. For the purpose of FIGS. 5A-5D, assume that mobile device 210 provides a cellular data testing system that includes a user interface. Assume further that the user interface is provided by mobile device 210 (e.g., via a screen of mobile device 210, etc.).

Figure 5A:
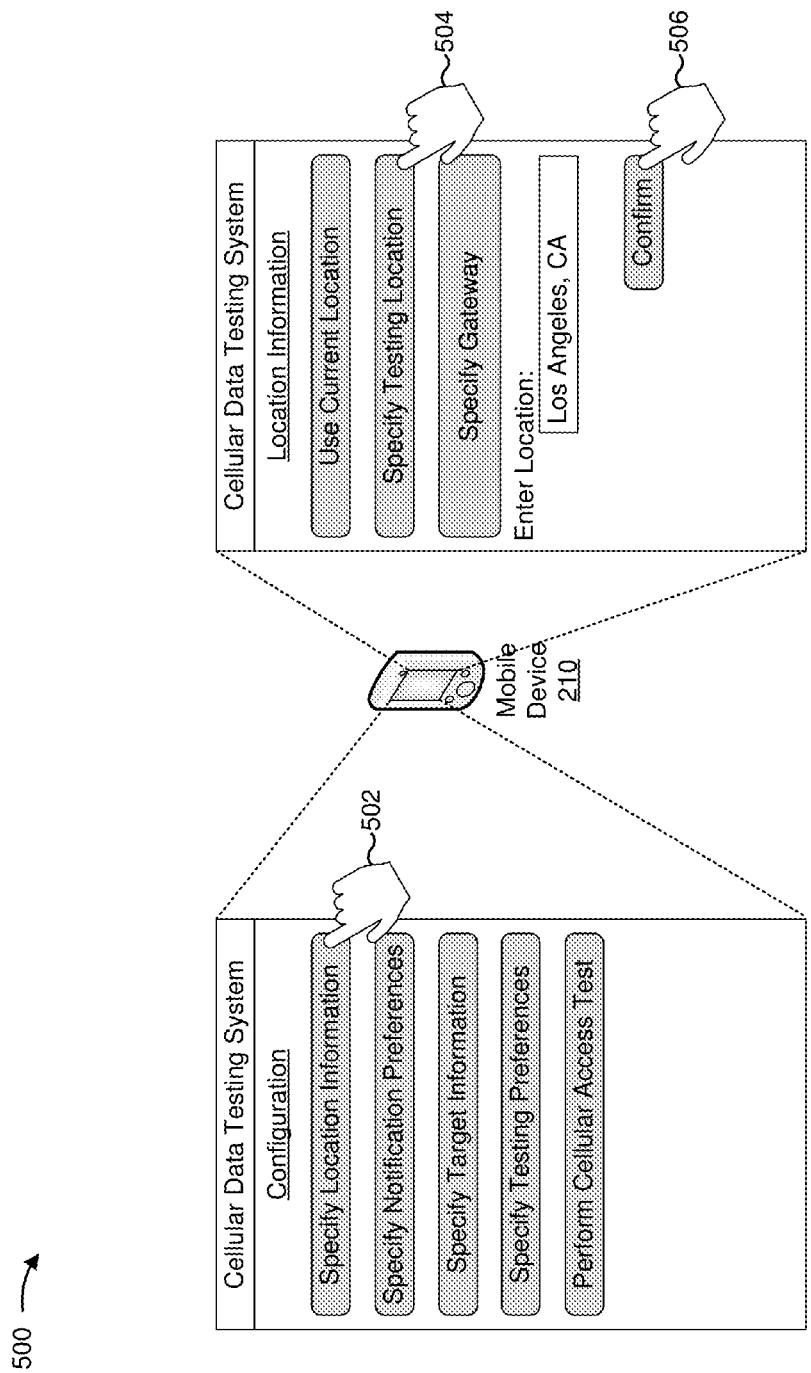
FIGS. 5A-5D are diagrams of an example implementation relating to the example process shown in FIG. 4.

As shown in FIG. 5A, and by reference number 502, mobile device 210 may receive a user interaction to specify location information. As shown, in some cases, a user may specify to use a current location of mobile device 210. In such a case, mobile device 210 may determine the current location of mobile device 210 (e.g., based on a connection with cellular network 240, based on a global positioning system component of mobile device 210, etc.). As shown by reference number 504, mobile device 210 may receive a user interaction to specify a testing location. Based on the specified testing location, mobile device 210 may configure a SIM card, of mobile device 210, to communicate with target network addresses via a gateway 230 associated with the testing location. Here, as shown by reference number 506, mobile device 210 receives information specifying a testing location of Los Angeles, Calif., and a user confirms the location of Los Angeles, Calif. Assume that mobile device 210 stores the location information locally.

As shown, in some cases, mobile device 210 may receive information specifying a particular gateway 230 to test. For example, gateways 230 may be associated with device identifiers (e.g., IP addresses, etc.), and mobile device 210 may receive information identifying a particular gateway 230. Based on the information identifying the particular gateway 230, mobile device 210 may determine a testing location associated with the particular gateway 230, and may configure a SIM card of mobile device 210 accordingly. Here, mobile device 210 does not receive information specifying a particular gateway 230.

Figure 5B:
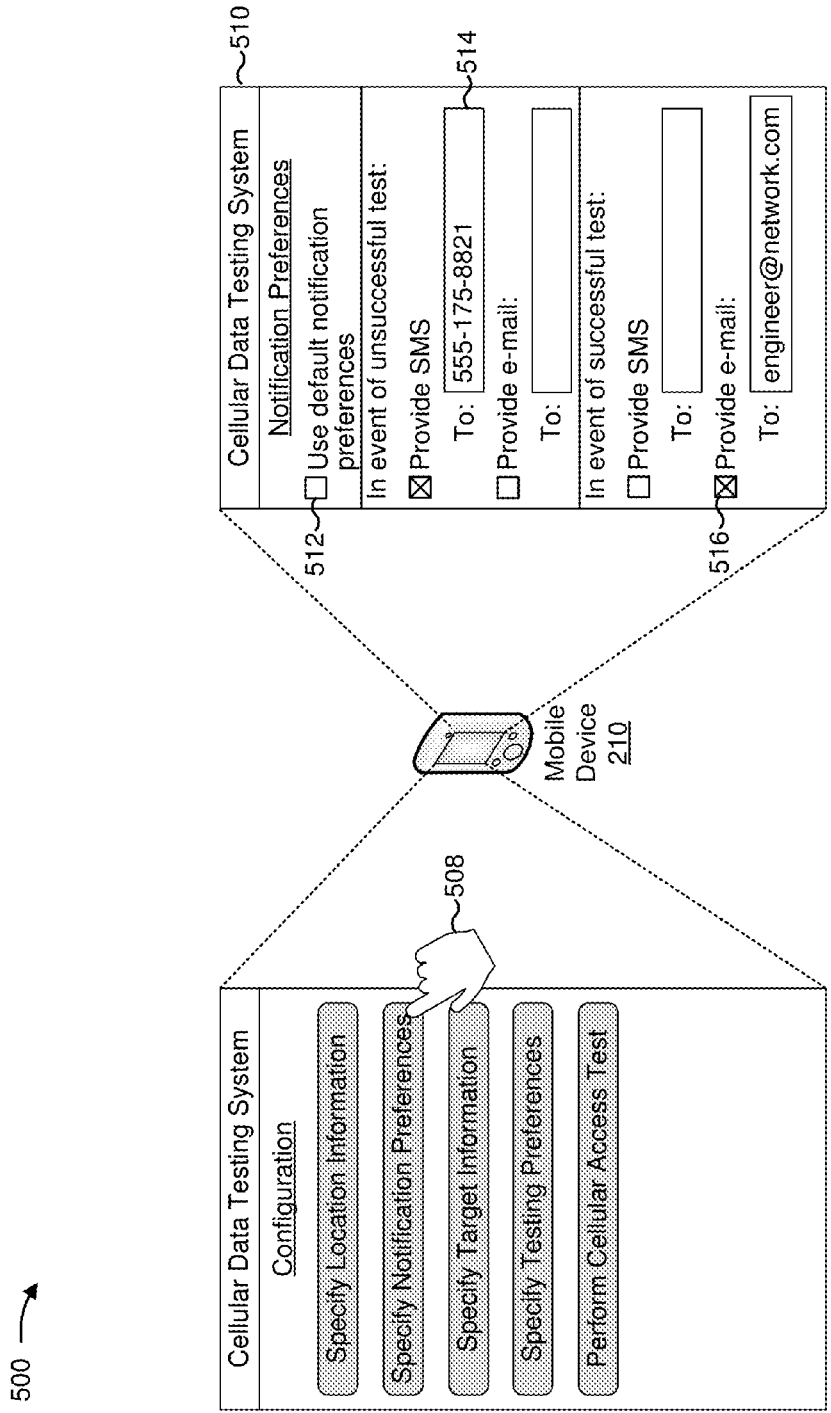

As shown in FIG. 5B, and by reference number 508, mobile device 210 may receive a user interaction to specify notification preferences. As shown by reference number 510, based on the user interaction to specify the notification preferences, mobile device 210 may provide a user interface to receive the notification preferences. As shown by reference number 512, in some cases, a user may specify to use default notification preferences. In that case, mobile device 210 may use locally stored default notification preferences, may obtain the default notification preferences from another device (e.g., server device 220, etc.), or the like. Here, mobile device 210 does not receive an indication to use default notification preferences.

As shown by reference number 514, mobile device 210 may receive a notification preference that specifies to provide an SMS message to an MDN of 555-175-8821 in the event of an unsuccessful cellular data test. As shown, the user interface may permit a user to input an email address to which to provide a failure notification. Here, mobile device 210 does not receive an email address. As shown by reference number 516, mobile device 210 may receive a notification preferences that specifies to provide an email message to an email address of "engineer@network.com" in the event of a successful cellular data test. Assume that mobile device 210 stores the notification preferences locally in memory.

Figure 5C:
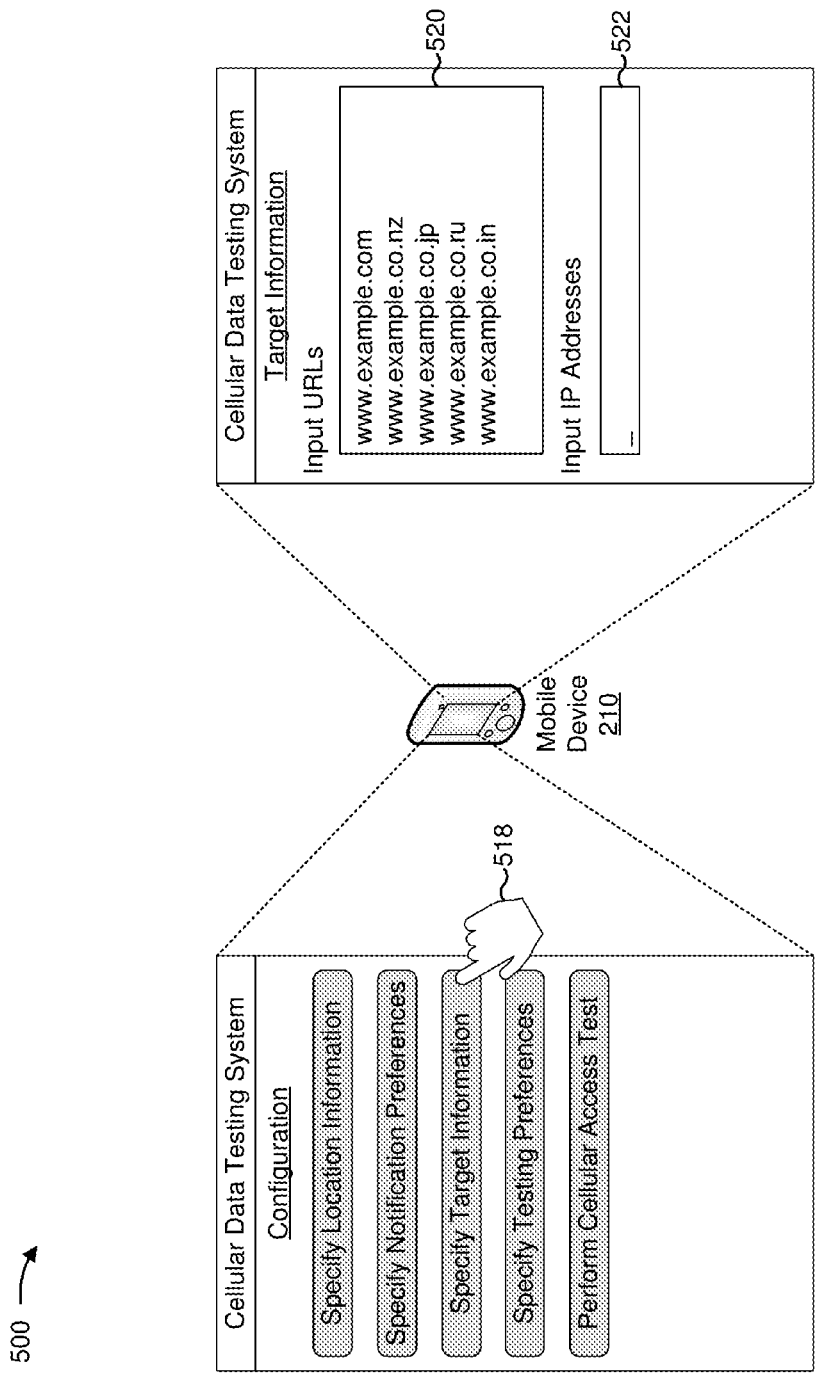

As shown in FIG. 5C, and by reference number 518, mobile device 210 may receive a user interaction to specify target information. The target information may identify target network addresses for the cellular data test. As shown by reference number 520, mobile device 210 may receive a set of URLs as target network addresses (e.g., www.example.com, www.example.co.nz, www.example.co.jp, www.example.co.ru, and www.example.co.in). As shown by reference number 522, in some cases, mobile device 210 may receive IP addresses as target network addresses. Here, mobile device 210 does not receive IP addresses as target network addresses.

Figure 5D:
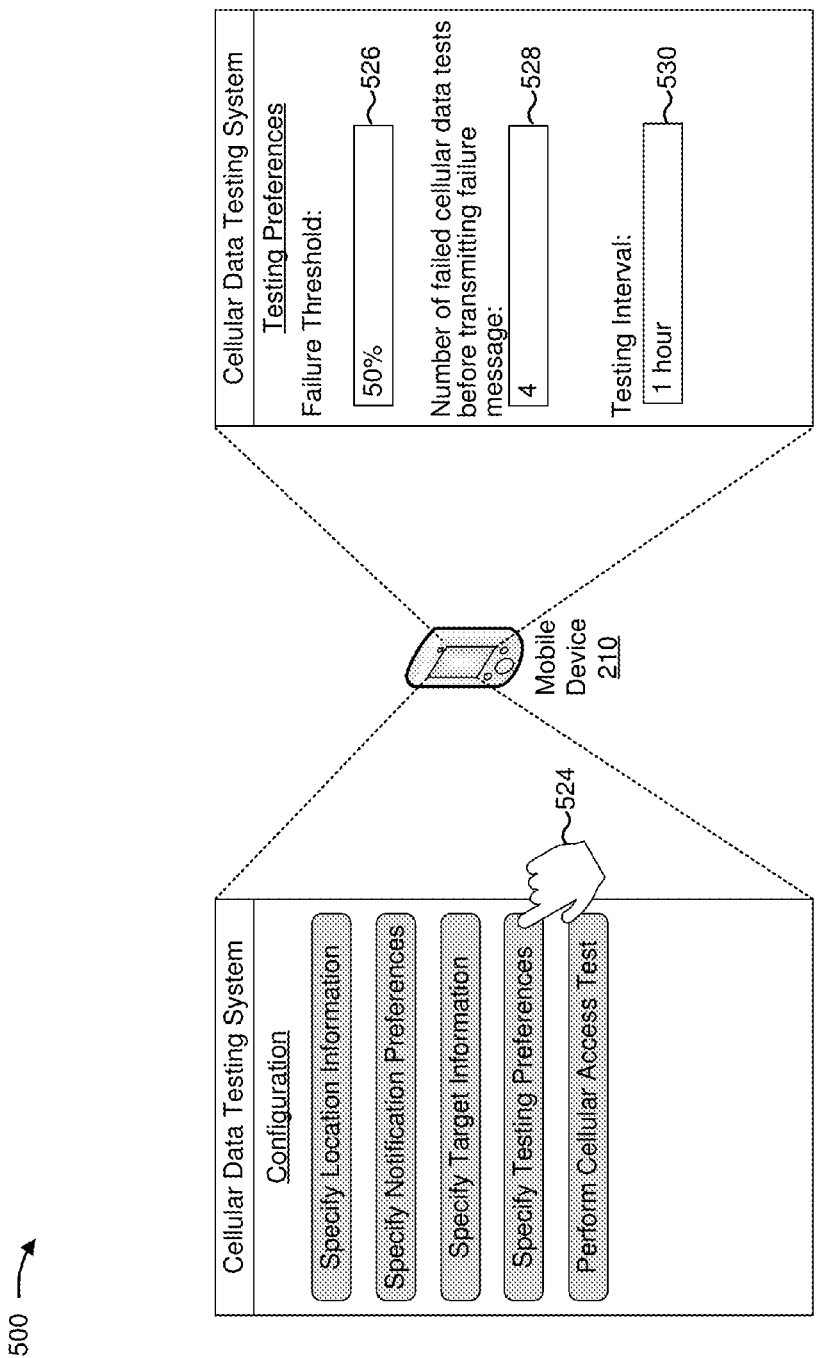

As shown in FIG. 5D, and by reference number 524, mobile device 210 may receive a user interaction to specify testing preferences. The testing preferences may include preferences related to performing the cellular data test. As shown by reference number 526, mobile device 210 may receive information identifying a failure threshold of 50%. When a cellular data test results in successful communication with less than 50% of the five target network addresses, mobile device 210 may determine that the cellular data test is unsuccessful based on the failure threshold.

As shown by reference number 528, mobile device 210 may receive information specifying a quantity of failed attempts before transmitting a failure notification. Here, mobile device 210 specifies four failures. Based on the quantity of failed attempts, mobile device 210 may attempt to communicate with the five target network addresses four times each before identifying the attempt as a failure. As shown by reference number 530, mobile device 210 may receive information specifying a testing interval. The testing interval may identify an interval of time in between attempts. Here, the testing interval includes a time period of one hour.

As indicated above, FIGS. 5A-5D are provided merely as an example. Other examples are possible and may differ from what was described with regard to FIGS. 5A-5D.

FIG. 6 is a flow chart of an example process 600 for performing a cellular data test. In some implementations, one or more process blocks of FIG. 6 may be performed by mobile device 210. In some implementations, one or more process blocks of FIG. 6 may be performed by another device or a group of devices separate from or including mobile device 210, such as server device 220 and/or gateway 230.

As shown in FIG. 6, process 600 may include receiving an instruction to perform a cellular data test (block 610). For example, mobile device 210 may receive an instruction to perform a cellular data test. In some implementations, mobile device 210 may receive the instruction via a user interface. For example, a user may interact with an element of the user interface (e.g., a button, a link, etc.) to provide the instruction. Additionally, or alternatively, mobile device 210 may receive the instruction from another device. For example, server device 220 may provide the instruction to mobile device 210.

In some implementations, mobile device 210 may perform the cellular data test without user input. For example, mobile device 210 may perform the cellular data test periodically (e.g., every five minutes, every hour, every twelve hours, every day, every week, etc.). Additionally, or alternatively, mobile device 210 may perform the cellular data test based on failing to communicate with a network address. For example, mobile device 210 may attempt to communicate with a device associated with a network address, and may fail to communicate with the device. Mobile device 210 may perform the cellular data test with regard to a set of target network addresses based on failing to communicate with the device. In this way, mobile device 210 may perform the cellular data test based on failing to communicate with a device associated with a network address, which may permit mobile device 210 to determine whether the failure to communicate is associated with the network address or with cellular network 240. Further, mobile device 210 may conserve resources by limiting tests to occasions when a potential network problem is occurring.

As further shown in FIG. 6, process 600 may include ending an existing session with a cellular network and/or deleting locally stored browsing information based on the instruction (block 620). For example, mobile device 210 may provide network traffic to and/or receive network traffic from cellular network 240 via an existing session (e.g., a multimedia communication session, a Voice over IP session, a video call session, a Voice over LTE session, an Internet session, etc.). Mobile device 210 may end the existing session, which may permit mobile device 210 to establish a new session and, thus, improve reliability and/or accuracy of test results obtained via the new session.

In some implementations, mobile device 210 may delete locally stored browsing information based on the instruction. For example, mobile device 210 may delete cookies, may end existing sessions with web services, may close existing browser tabs, may unblock blocked webpages, or the like. By clearing locally stored browsing information, mobile device 210 may ensure that a failure to communicate with a target network address is not caused by the locally stored browsing information.

As further shown in FIG. 6, process 600 may include obtaining location information, notification preferences, target information, and/or testing preferences (block 630). For example, mobile device 210 may obtain location information, notification preferences, target information, and/or testing preferences. In some implementations, mobile device 210 may obtain the location information, notification preferences, target information, and/or testing preferences from local storage. For example, mobile device 210 may locally store the location information, notification preferences, target information, and/or testing preferences based on performing the operations described in connection with FIG. 4, and may obtain the information from local storage.

In some implementations, mobile device 210 may obtain the location information, notification preferences, target information, and/or testing preferences from server device 220. For example, server device 220 may store location information, notification preferences, target information, and/or testing preferences for a cellular data test. Mobile device 210 may determine to perform a cellular data test (e.g., based on receiving an instruction to perform a cellular data test, based on a failure to transmit network traffic to a device associated with a network address, etc.), and may obtain the location information, notification preferences, target information, and/or testing preferences from server device 220.

In some implementations, server device 220 may store location information, notification preferences, target information, and/or testing preferences for a variety of cellular data tests, and mobile device 210 may obtain location information, notification preferences, target information, and/or testing preferences for a particular cellular data test (e.g., based on a location of mobile device 210 and/or a device associated with a target network address, based on a device type of mobile device 210, based on results of cellular data tests performed by other mobile devices 210, etc.). In this way, mobile device 210 may obtain location information, notification preferences, target information, and/or testing preferences from server device 220, which may permit an administrator of server device 220 to cause desired cellular data tests to be performed and, thus, improve reliability of cellular network 240.

In some implementations, mobile device 210 may obtain the location information, notification preferences, target information, and/or testing preferences based on receiving the instruction to perform the cellular data test. For example, mobile device 210 may prompt a user to provide information and/or preferences via a user interface of mobile device 210, based on receiving the instruction to perform the cellular data test.

As further shown in FIG. 6, process 600 may include configuring a component based on the location information (block 640). For example, mobile device 210 may configure a component of mobile device 210 based on the location information. In some implementations, a SIM card may store information identifying a location of mobile device 210. Mobile device 210 may configure the SIM card to associate mobile device 210 and/or the SIM card with the testing location.

Cellular network 240 may route network traffic, of mobile device 210, based on the location identified by the SIM card. For example, cellular network 240 may provide network traffic to target network addresses via a gateway 230 that is selected based on the location identified by the SIM card. The location identified by the SIM card may be independent of an actual location of mobile device 210. For example, mobile device 210 may be capable of setting a testing location on the SIM card, irrespective of the actual location of mobile device 210. By setting the testing location on the SIM card, mobile device 210 may perform the cellular data test via a first gateway 230 when in a region associated with a second gateway 230, which may reduce expense associated with testing cellular network 240 and/or improve versatility of the cellular data testing system.

As further shown in FIG. 6, process 600 may include establishing a new session with the cellular network (block 650). For example, mobile device 210 may establish a new session with cellular network 240 to perform the cellular data test. In some implementations, mobile device 210 may establish the new session based on a protocol, such as a session initiation protocol, a transmission control protocol, or the like. By ending the existing session and establishing the new session, mobile device 210 may ensure that testing results are unaffected by information associated with the existing session.

In some implementations, mobile device 210 may select a particular type of session to initiate based on a target network address. For example, if a target network address is associated with a VoIP service, mobile device 210 may initiate a VoIP session. As another example, if a target network address is an IP address, mobile device 210 may initiate an Internet Protocol session. In this way, mobile device 210 may determine a particular type of session to initiate based on a target network address, which may reduce a quantity of user input required to perform the cellular data test and, thus, conserve resources of mobile device 210.

As further shown in FIG. 6, process 600 may include attempting to communicate with one or more target network addresses that are identified by the target information (block 660). For example, mobile device 210 may attempt to communicate with one or more target network addresses. The one or more target network addresses may be identified by the target information.

Mobile device 210 may attempt to provide one or more packets to devices associated with the one or more target network addresses, in some implementations. For example, mobile device 210 may provide network traffic, as one or more packets, to be routed via a particular gateway 230 that is in the testing location. Additionally, or alternatively, mobile device 210 may provide a message to the one or more target network addresses. For example, mobile device 210 may generate an email, a voice message, a system message, or the like, and may provide the message to one or more target network addresses.

In some implementations, mobile device 210 may attempt to communicate with the one or more target network addresses by attempting to establish a session with devices associated with the one or more target network addresses. For example, if a target network address is associated with a video calling service, mobile device 210 may attempt to establish a video calling session with a device associated with the target network address. As another example, if a target network address is associated with a virtual private network service, mobile device 210 may attempt to establish a virtual private network session with a device associated with the target network address. In this way, mobile device 210 may test network services by attempting to establish sessions with the network services, which may reduce a quantity of network traffic transmitted by mobile device 210 and, thus, conserve resources of mobile device 210 and/or cellular network 240.

As further shown in FIG. 6, process 600 may include determining a result of attempting to communicate with the one or more target network addresses (block 670). For example, mobile device 210 may determine a result of attempting to communicate with the one or more target network addresses. The result may include, for example, a failure, a success, a timeout, a partial success, or the like.

Mobile device 210 may determine the result based on receiving a response from a target network address, or based on not receiving a response from a target network address.

In some implementations, mobile device 210 may determine that an attempt to communicate is successful. For example, mobile device 210 may receive an expected response from a target network address (e.g., a message accepting a session with mobile device 210, a response to one or more packets transmitted toward the target network address, etc.) and/or cellular network 240 (e.g., a message indicating that the communication is successful, a message indicating that network traffic is successfully delivered to a device associated with the target network address, etc.). Additionally, or alternatively, mobile device 210 may determine that an attempt to communicate is unsuccessful. For example, mobile device 210 may receive information indicating that the attempt to communicate is unsuccessful (e.g., information indicating that an email is undeliverable, information indicating that a target network address does not exist or is unreachable, etc.).

In some implementations, mobile device 210 may attempt to communicate with a set of target network addresses. For example, mobile device 210 may provide one or more packets to each target network address in the set of target network addresses. Mobile device 210 may determine that one or more of the attempts to communicate are unsuccessful, and/or that one or more of the attempts to communicate are successful. Mobile device 210 may, in some implementations, determine whether the successful and/or unsuccessful attempts to communicate satisfy a failure threshold.

As further shown in FIG. 6, process 600 may include selectively reattempting to communicate with the one or more target network addresses, and/or providing a notification, based on the result (block 680). For example, mobile device 210 may selectively perform an action based on whether the successful and/or unsuccessful attempts to communicate satisfy a failure threshold. In some implementations, mobile device 210 may reattempt to communicate with the one or more target network addresses. For example, when the successful and/or unsuccessful attempts do not satisfy the failure threshold, mobile device 210 may reattempt to communicate with the one or more target network devices.

In some implementations, mobile device 210 may provide a notification based on the result and/or based on the notification preferences. For example, if the result (e.g., a ratio of successful attempts to unsuccessful attempts) satisfies the failure threshold, mobile device 210 may provide a success notification to an entity identified in the notification preferences. For example, mobile device 210 may provide an email, a short message service (SMS) message, a phone call, a system message, or the like. In this way, mobile device 210 may notify an entity of a successful cellular data test based on notification preferences, which may improve versatility of the cellular data testing system.

As another example, if the result does not satisfy the failure threshold, mobile device 210 may provide a failure notification to an entity identified in the notification preferences. In some implementations, mobile device 210 may not provide a notification based on an unsuccessful cellular data test. For example, if testing preferences indicate to perform a particular quantity of cellular data tests before providing a failure notification, mobile device 210 may determine whether mobile device 210 has performed the particular quantity of cellular data tests. If mobile device 210 has not performed the particular quantity of cellular data tests, mobile device 210 may not provide the failure notification.

In such a case, mobile device 210 may reattempt to communicate with the one or more target network addresses. Additionally, or alternatively, if mobile device 210 has performed the particular quantity of cellular data tests, mobile device 210 may provide the failure notification.

In some implementations, mobile device 210 may provide a notification to a user of mobile device 210 based on the result. For example, mobile device 210 may provide a notification via a user interface of mobile device 210. The notification may include information related to the cellular data test (e.g., the target network addresses, the failure threshold, a quantity of successful attempts and/or unsuccessful attempts, etc.).

In some implementations, mobile device 210 may selectively perform an action without user input (e.g., automatically). For example, mobile device 210 may perform a first cellular data test, and may determine a first result (e.g., a first ratio of successful attempts to unsuccessful attempts, etc.). Mobile device 210 may perform a second cellular data test (e.g., after a particular period of time, based on a failure to communicate with a network address, etc.), and may determine a second result. Mobile device 210 may compare the first result and the second result, and may perform an action (e.g., without user intervention, input, etc.) based on comparing the first result and the second result.

For example, if the first result is different from the second result, mobile device 210 may provide a notification to one or more entities, may perform a third cellular data test, may store information associated with the first result and/or the second result, or the like. As another example, if the first result does not differ from the second result, mobile device 210 may provide a notification to one or more entities, may schedule a third cellular data test in the future, may store information associated with the first result and/or the second result, or the like. In this way, mobile device 210 may perform a cellular data test via a particular gateway 230, and may automatically provide notifications and/or perform actions based on a result of the cellular data test, which may conserve processor resources associated with mobile device 210 and/or may conserve resources used to receive user input for the cellular data test.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7E are diagrams of an example implementation 700 relating to example process 600 shown in FIG. 6. FIGS. 7A-7E show an example of performing a cellular data test. For the purpose of FIGS. 7A-7E, assume that the operations described in connection with FIGS. 5A-5D have been performed. Assume further that mobile device 210 is located in Natick, Mass.

Figure 7A:
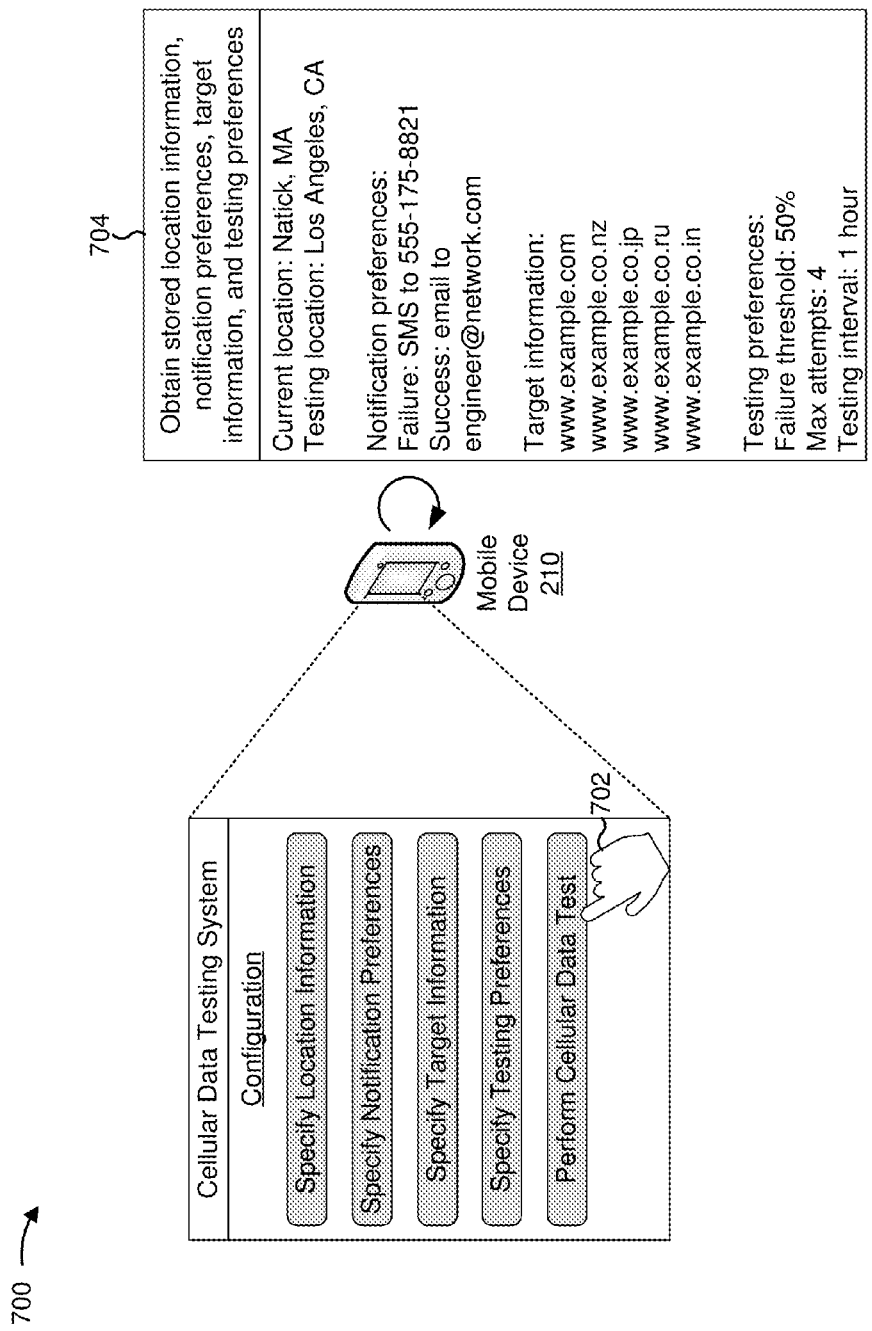
FIGS. 7A-7E are diagrams of an example implementation relating to the example process shown in FIG. 6.

As shown in FIG. 7A, and by reference number 702, mobile device 210 may receive a user interaction to cause mobile device 210 to perform a cellular data test. As shown by reference number 704, mobile device 210 may obtain location information, notification preferences, target information, and testing preferences. As shown, mobile device 210 may obtain the location information, notification preferences, target information, and testing preferences from storage (e.g., storage associated with mobile device 210). As further shown, the location information, notification preferences, target information, and testing preferences may include the information received in connection with FIGS. 5A-5D, above.

Figure 7B:
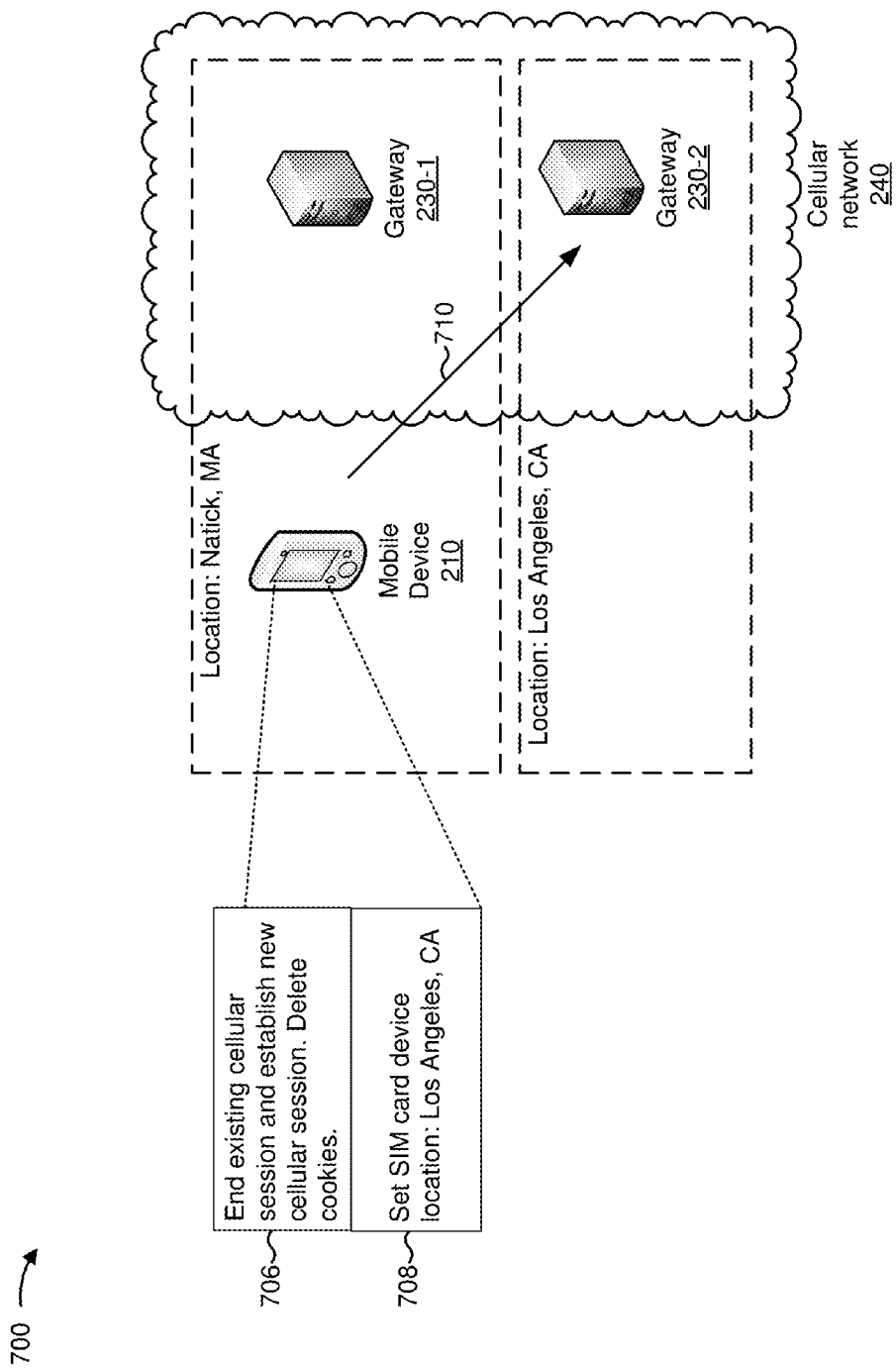

As shown in FIG. 7B, and by reference number 706, mobile device 210 may end an existing cellular session with cellular network 240. As further shown, mobile device 210 may establish a new cellular session with cellular network 240. As shown, mobile device 210 may delete locally stored browser information (e.g., cookies, browser history, etc.) to perform the cellular data test.

As shown by reference number 708, mobile device 210 may configure a SIM card of mobile device 210 to store information identifying a testing location of Los Angeles, Calif. Assume that mobile device 210 modifies the SIM card to set the device location of mobile device 210 based on the location information. As shown, mobile device 210 is located in Natick, Mass., which is associated with gateway 230-1. As shown by reference number 710, based on setting the device location of mobile device 210 to Los Angeles, mobile device 210 may be associated with gateway 230-2, which is associated with the testing location of Los Angeles, Calif.

Figure 7C:
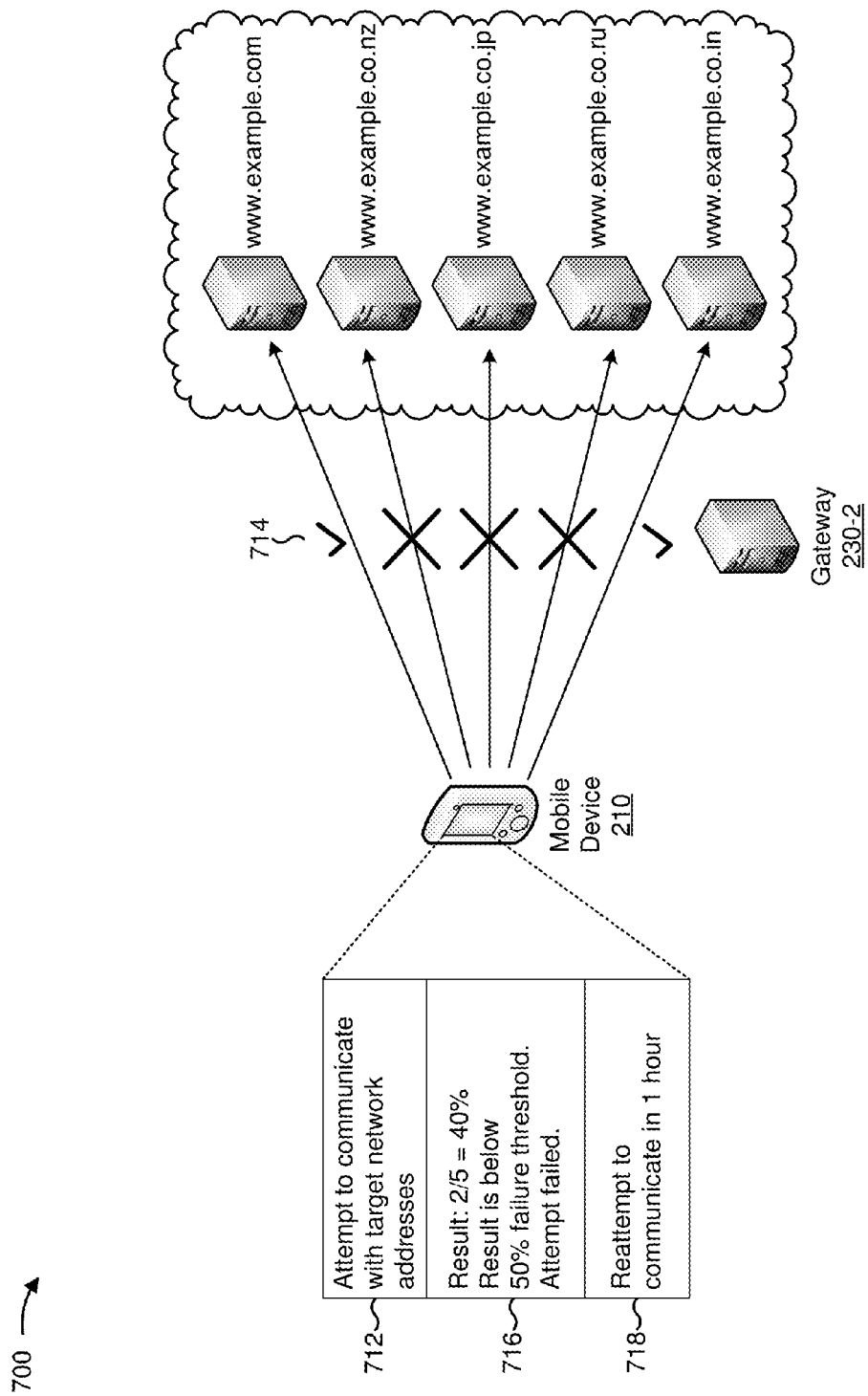

As shown in FIG. 7C, and by reference number 712, mobile device 210 may perform a first cellular data test by attempting to communicate with the target network addresses. As shown by reference number 714, mobile device 210 may transmit network traffic to the five target network addresses. As shown, mobile device 210 may transmit the network traffic via gateway 230-2 based on gateway 230-2 being associated with the location of Los Angeles, Calif.

As shown, mobile device 210 successfully communicates with two of the five target network addresses (e.g., the attempt to communicate with www.example.com and the attempt to communicate with www.example.co.in). As further shown, mobile device 210 unsuccessfully attempts to communicate with three of the five target network addresses (e.g., the attempts to communicate with www.example.co.nz, www.example.co.jp, and www.example.co.ru). As shown by reference number 716, mobile device 210 may determine whether the first cellular data test satisfies the failure threshold of 50%. Here, the first cellular data test does not satisfy the failure threshold, based on three of the five attempts to communicate being unsuccessful. As shown by reference number 718, mobile device 210 may perform a second cellular data test with regard to the five target network addresses after one hour passes (e.g., based on the testing preferences).

Figure 7D:
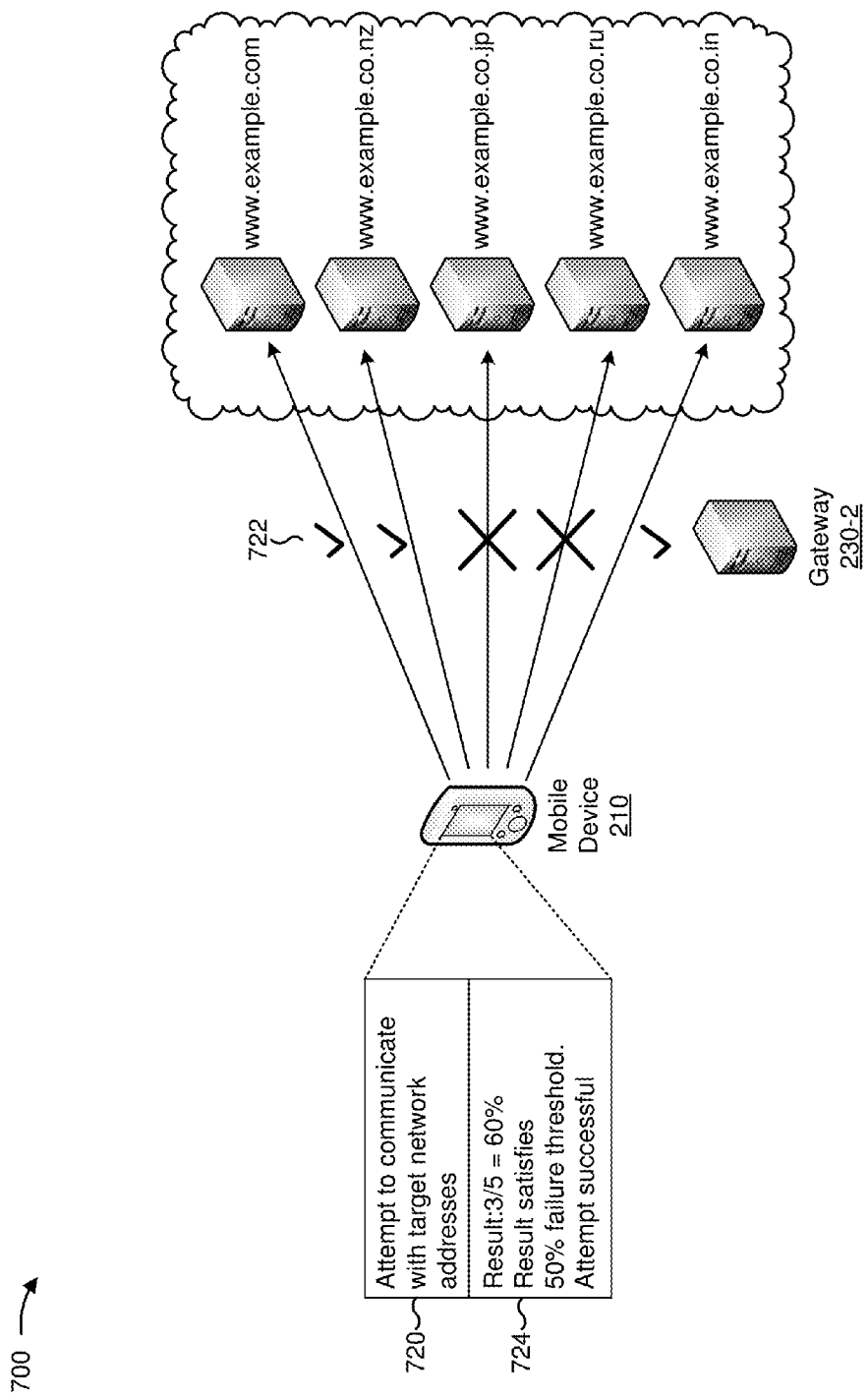

As shown in FIG. 7D, and by reference number 720, mobile device 210 may perform a second cellular data test with regard to the target network addresses. Assume that one hour had passed between the first cellular data test and the second cellular data test. As shown by reference number 722, mobile device 210 may provide network traffic to the five target network addresses via gateway 230-2. As further shown, mobile device 210 successfully communicates with three of the five target network addresses (e.g., www.example.com, www.example.co.nz, and www.example.co.in). As shown, mobile device 210 unsuccessfully attempts to communicate with two of the five target network addresses (e.g., www.example.co.jp and www.example.co.ru).

As shown by reference number 724, mobile device 210 may determine whether the second cellular data test satisfies the failure threshold of 50%. Here, the second cellular data test satisfies the failure threshold based on three of the five attempts to communicate being successful. Based on the second cellular data test being successful, mobile device 210 may determine to provide an email message, and to stop performing cellular data tests.

Figure 7E:
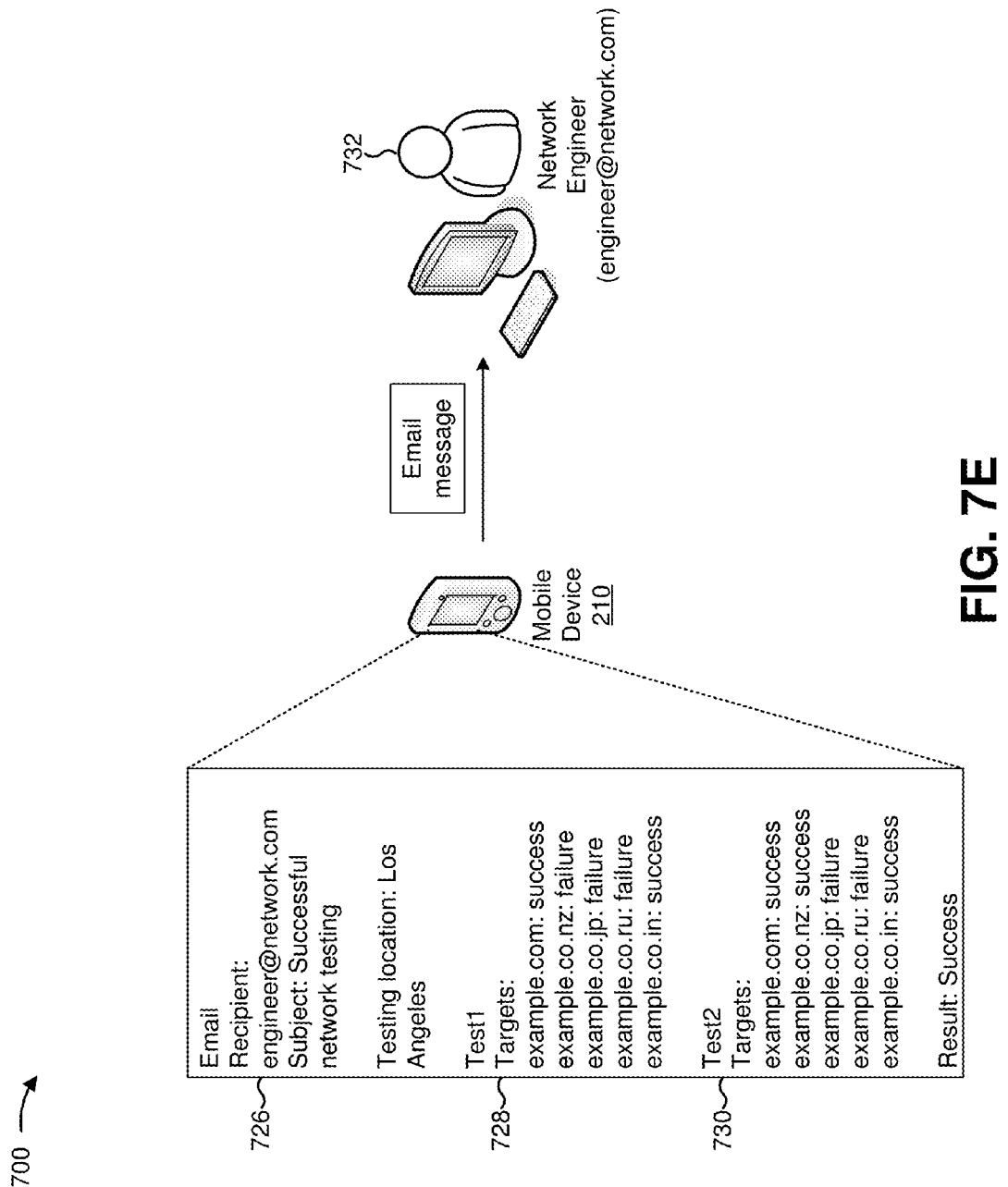

As shown in FIG. 7E, mobile device 210 may provide an email message based on the second cellular data test. As shown by reference number 726, mobile device 210 may provide the email message to a particular address based on the notification preferences (e.g., engineer@network.com). As shown by reference number 728, the email message may include information describing the first cellular data test. Here, the email message identifies the five target network addresses and identifies whether the attempt to communicate with each target network address was successful.

As shown by reference number 730, the email message may include information describing the second cellular data test. Here, the email message identifies the five target network addresses and identifies whether the attempt to communicate with each target network address was successful. Further, the email message indicates that the second cellular data test was successful. As shown by reference number 732, a device associated with the email address of engineer@network.com may receive the email message.

As indicated above, FIGS. 7A-7E are provided merely as an example. Other examples are possible and may differ from what was described with regard to FIGS. 7A-7E.

In this way, mobile device 210 may perform cellular data testing via a gateway 230 associated with a testing location, which may or may not be associated with a location of mobile device 210. By testing gateways 230 associated with different testing locations independent of a location of mobile device 210, mobile device 210 may reduce expense and/or network resources involved in performing the cellular data testing and/or conserve resources of a network engineer administrator.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A mobile device, comprising:
  one or more processors to:
    receive preferences related to performing a cellular data test in a cellular network,
      the preferences identifying one or more target network addresses and a threshold for determining whether the cellular data test is successful;
    receive location information identifying a test location;
    configure a component of the mobile device to communicate with the one or more target network addresses via a gateway associated with the test location;
    perform the cellular data test by transmitting network traffic to the one or more target network addresses via the gateway;
    determine a result of the cellular data test based on transmitting the network traffic to the one or more target network addresses via the gateway,
      the result being determined based on comparing a first quantity of the one or more target network addresses that are associated with devices that receive the network traffic with a second quantity of the one or more target network addresses that are associated with devices that do not receive the network traffic;
    determine whether the result satisfies the threshold; and
    selectively provide a notification based on whether the result satisfies the threshold.

2. The mobile device of claim 1, where the one or more processors are further to:
  receive information identifying a recipient network address for the notification; and
  provide the notification based on the recipient network address.

3. The mobile device of claim 1, where the cellular data test is a first cellular data test; and
  where the one or more processors are further to:
    receive information specifying a condition for performing a second cellular data test based on the result; and
    selectively perform the second cellular data test based on the result.

4. The mobile device of claim 1, where the mobile device is located at a particular location,
  the particular location being a location independent of the test location.

5. The mobile device of claim 1, where the one or more processors are further to:
  receive an instruction to perform the cellular data test;
  end an existing session with the cellular network based on the instruction; and
  establish a new session with the cellular network via which to perform the cellular data test.

6. The mobile device of claim 5, where the one or more processors are further to:
  delete locally stored browsing information based on receiving the instruction.

7. A computer-readable medium storing instructions, the instructions comprising:
  one or more instructions that, when executed by one or more processors of a mobile device, cause the one or more processors to:
    obtain preferences related to performing a cellular data test in a cellular network,
      the preferences identifying one or more target network addresses and a threshold for determining whether the cellular data test is successful;
    obtain location information identifying a test location;
    receive an instruction to perform the cellular data test;
    configure a component of the mobile device to communicate with the one or more target network addresses via a gateway associated with the test location and based on the instruction;
    perform the cellular data test by transmitting network traffic to the one or more target network addresses via the gateway;
    determine a result of the cellular data test based on transmitting the network traffic to the one or more target network addresses via the gateway,
      the result being determined based on comparing a first quantity of the one or more target network addresses that are associated with devices that receive the network traffic with a second quantity of the one or more target network addresses that are associated with devices that do not receive the network traffic;
    determine whether the result satisfies the threshold; and
    selectively provide a notification based on whether the result satisfies the threshold.

8. The computer-readable medium of claim 7, where the instructions further comprise:
  one or more instructions that, when executed by the one or more processors, cause the one or more processors to:
    provide the notification to a particular network address based on the preferences.

9. The computer-readable medium of claim 7, where the instructions further comprise:
  one or more instructions that, when executed by the one or more processors, cause the one or more processors to:

configure a subscriber identity module card of the mobile device based on the test location.

10. The computer-readable medium of claim 7, where the gateway is a packet data network gateway; and
where the network traffic includes one or more packets.

11. The computer-readable medium of claim 7, where the instructions further comprise:
one or more instructions that, when executed by the one or more processors, cause the one or more processors to:
receive the preferences via a user interface; and
receive the instruction via the user interface.

12. The computer-readable medium of claim 7, where the instructions further comprise:
one or more instructions that, when executed by the one or more processors, cause the one or more processors to:
provide information identifying the one or more target network addresses; and
provide information indicating whether one or more devices, associated with the one or more target network addresses, received the network traffic.

13. A method, comprising:
obtaining, by a mobile device, preferences related to performing a cellular data test in a cellular network, the preferences identifying one or more target network addresses and a threshold for determining whether the cellular data test is successful;
obtaining, by the mobile device, location information identifying a test location;
receiving, by the mobile device, an instruction to perform the cellular data test;
ending, by the mobile device, an existing session with the cellular network based on the instruction;
establishing, by the mobile device, a new session with the cellular network after ending the existing session;
configuring, by the mobile device, a component of the mobile device to communicate with the one or more target network addresses via a gateway associated with the test location;
performing, by the mobile device, the cellular data test by transmitting network traffic to the one or more target network addresses via the gateway;
determining, by the mobile device, a result of the cellular data test based on transmitting the network traffic to the one or more target network addresses via the gateway, the result being determined based on comparing a first quantity of the one or more target network addresses that are associated with devices that receive the network traffic with a second quantity of the one or more target network addresses that are associated with devices that do not receive the network traffic;
determining, by the mobile device, whether the result satisfies the threshold; and
providing, by the mobile device, a notification based on whether the result satisfies the threshold.

14. The method of claim 13, further comprising:
selectively transmitting second network traffic to the one or more target network addresses or providing the notification,
the second network traffic being transmitted when the result does not satisfy the threshold, and
the notification being provided when the result satisfies the threshold.

15. The method of claim 14, further comprising:
obtaining information identifying an interval of time; and
transmitting the second network traffic a length of time after transmitting the first network traffic,
the length of time corresponding to the interval of time.

16. The method of claim 13, where the location information identifies a particular gateway; and
where the method further comprises:
determining the test location based on the particular gateway.

17. The method of claim 13, where the mobile device is located at a particular location,
the particular location being independent of the test location.

18. The method of claim 13, further comprising:
deleting locally stored browsing information based on the instruction and before establishing the new session.

19. The mobile device of claim 1, where the one or more processors are further to:
predefine a quantify of failed attempts as the threshold; and
provide a failure notification when a quantity of failed attempts satisfies the threshold.

20. The computer-readable medium of claim 7, where the cellular data test is a first cellular data test and where the instructions further comprise:
one or more instructions that, when executed by the one or more processors, cause the one or more processors to:
receive information specifying a condition for performing a second cellular data test based on the result of the first cellular data test; and
selectively perform the second cellular data test based on the result.

* * * * *